May 28, 1968  M J. STURTEVANT ET AL  3,385,000
GLASS WINDOW GUIDE
Filed March 9, 1967  2 Sheets-Sheet 2
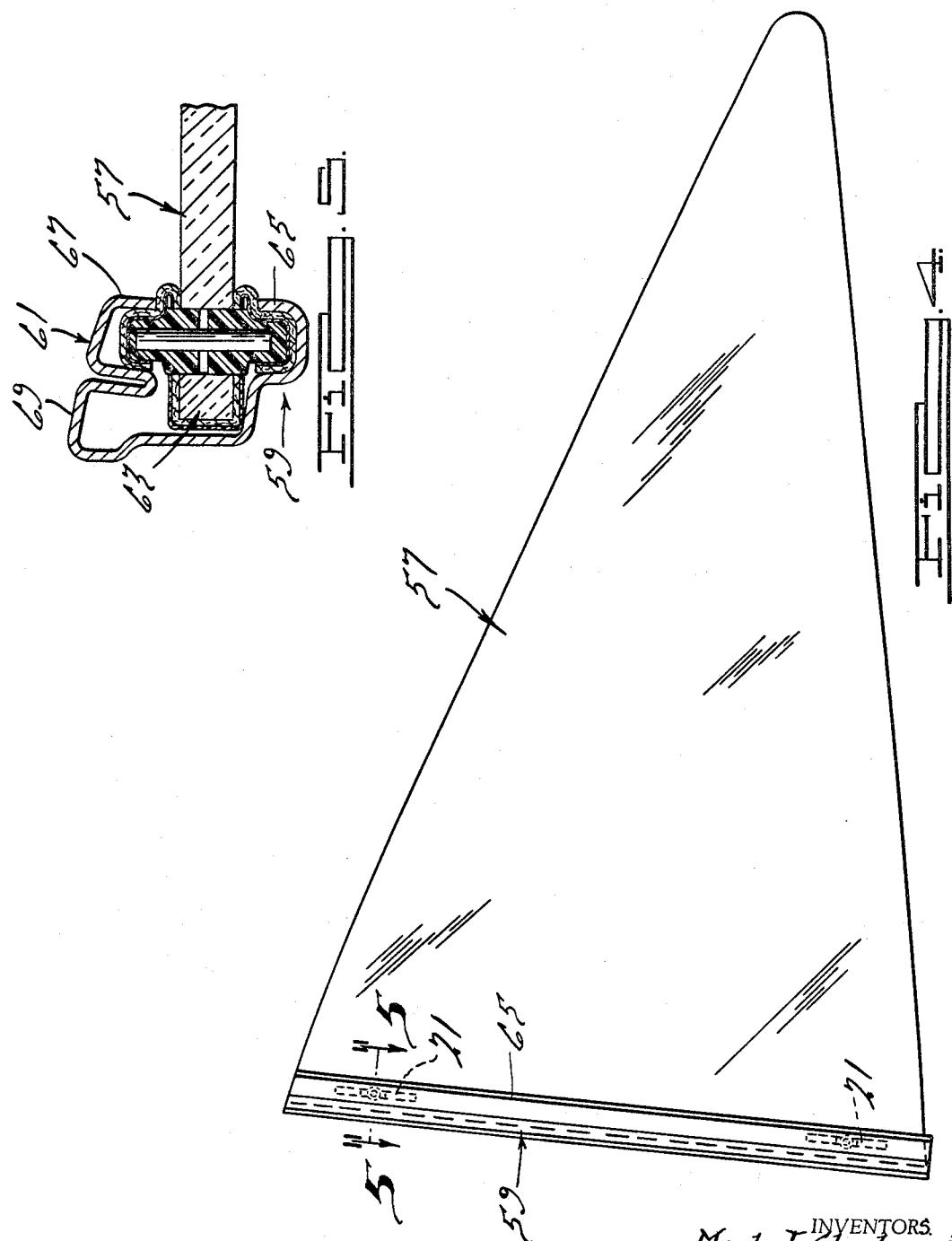
INVENTORS.
Mark J. Sturtevant,
Neil T. Kelley,
BY Herbert Kilgus
Harness, Talburtt & Baldwin
ATTORNEYS.

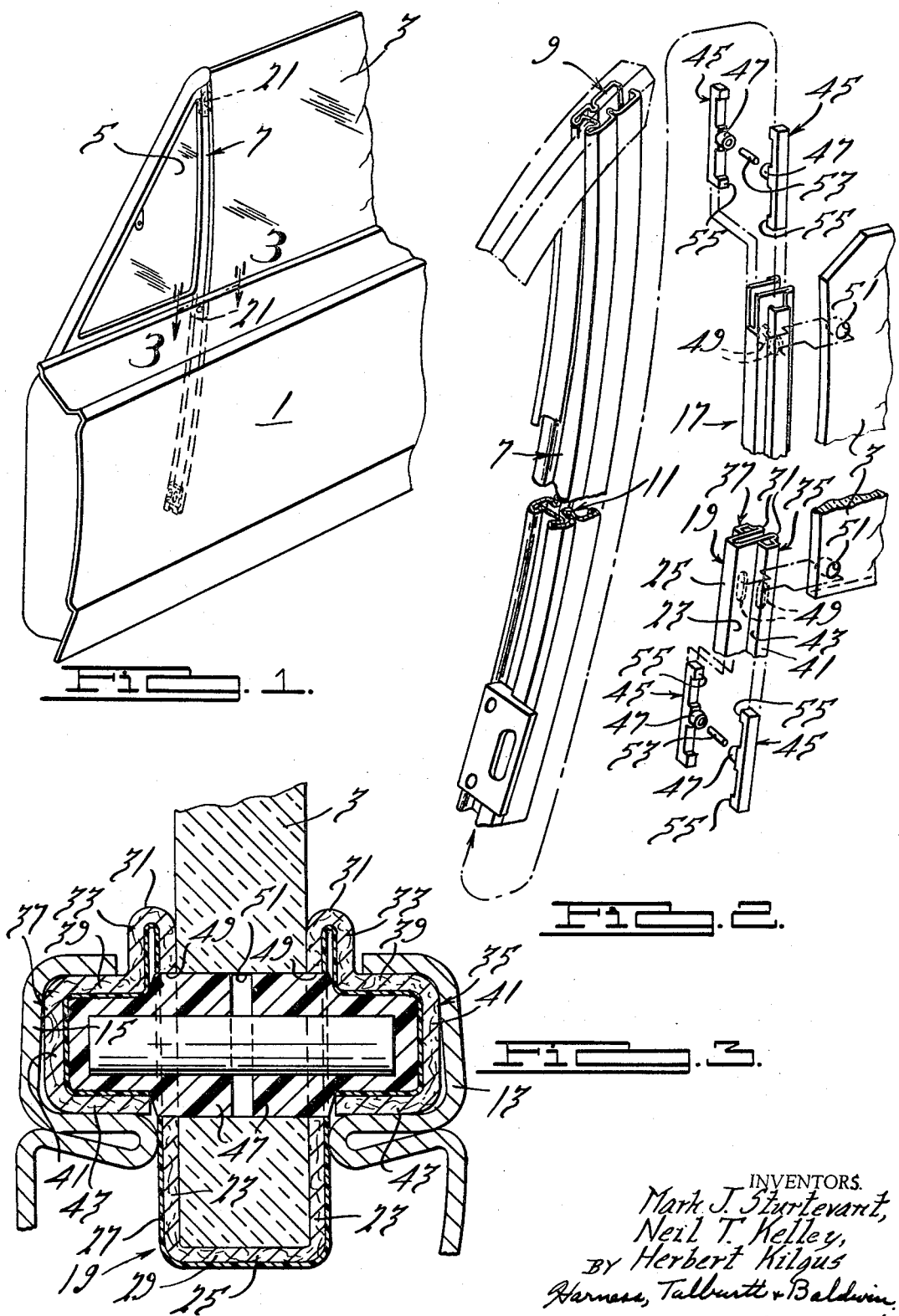

United States Patent Office 3,385,000
Patented May 28, 1968

3,385,000
GLASS WINDOW GUIDE
Mark J. Sturtevant, Grosse Pointe, Neil T. Kelley, Bloomfield, and Herbert Kilgus, Grosse Pointe, Mich., assignors to Chrysler Corporation, Highland Park, Mich., a corporation of Delaware
Filed Mar. 9, 1967, Ser. No. 622,385
9 Claims. (Cl. 49—440)

ABSTRACT OF THE DISCLOSURE

Guide or support for a glass window of an automobile including a length of weatherstripping formed around an edge of a window glass and with channel-shaped side portions which fit in channels of an elongated member forming a division bar or attached to a pillar, and relatively rigid guide or support members in said channel-shaped portions connected together through side portions of the weatherstripping and the glass for sliding or pivoting of the window in the elongated member.

*Background of the invention*

This invention relates to an improvement over the device shown in copending U.S. Patent application Ser. No. 574,236, filed Aug. 22, 1966, entitled Glass Window Slide Device, and more particularly to a device for supporting and guiding the sliding movement of window glass in automotive vehicles in one instance, and for supporting guiding the swinging of a window such as a rear vent window, in another instance.

Automobiles which have a front vent window at the upper forward corner of the front doors thereof have a vent window division bar between the front door window glass and the vent window glass. This division bar usually extends from near the bottom of the door assembly to the top thereof and has a channel in which the forward or leading edge of the door window glass rides. These door glass windows are subjected to an outwardly directed force, due to air intake vents, etc., which increases as the speed of the automobile increases. This force is greatest in the area of the window which is adjacent the division bar. Accordingly, to reduce the possibility of excessive deflection of the window and the accompanying air leakage, it is important that the division bar not only be relatively strong, but that the guide device on the front of the window prevent undue play between the leading edge of the window and the division bar. Moreover, it is important that the sliding joint formed by the channel and leading edge of the window not only be waterproof to prevent water leakage into the automobile, but that it also prevent any sideward or fore and aft rocking motion of the glass without rendering it extremely difficult to raise and lower the window.

One of the problems of previously known types of window moving mechanisms has been the requirement of a double arm or so called X-arm type of regulator mechanism to insure that the forward edge of the window was maintained in the division bar as the window was raised and lowered, i.e., to insure that the window movement was parallel to the division bar. The X-arm type of regulator mechanism not only was relatively expensive, but also required the removal of the door trim panel if it became necessary to adjust it. The present invention allows a single point connection between the window and the regulator mechanism, thereby permitting the use of a regulator mechanism which is less expensive and easier to adjust, i.e., adjustment of the door vent window and door glass assembly does not require the adjustment of the regulator and may be accomplished without the removal of the door trim panel.

Furthermore, vent windows, such as the vent windows located in the body or rear door of an automobile adjacent the back seat are usually connected by hinges located at the forward edge of the window for guiding the latter as the rearward edge of the window is swung outwardly a few inches. Heretofore the hinges, in addition to their cost, have required the utilization of special sealing materials of various shapes to prevent leakage of water through the hinges. The present invention, in addition to its use as an improved device for guiding the sliding movement of a window movable in a general vertical direction, is also adapted to be used as a hinge or guide for vent windows.

*Summary of the invention*

Briefly, the invention comprises an improved device for supporting a window glass for movement, pivotal or sliding in a recessed frame, the device including first weatherstripping portions extending along the margins of one edge of the glass on opposite sides of the latter, a support having generally vertical portions on opposite sides of the glass and outside the first weatherstripping portions, second weatherstripping portions integrally connected to the first weatherstripping portions and extending back over the generally vertical portions of the support, the generally vertical portions and the second weatherstripping portions extending into the frame, and generally horizontal connecting means extending from and between the generally vertical portions of the support through a hole in the glass for connecting the weatherstripping and the glass together and to the generally vertical portions of the support.

One of the primary objects of this invention is to provide an improved device for supporting and guiding a window glass during raising and lowering movements of the latter which permits a single point connection between the window and the regulator mechanism, which is substantially air and waterproof, and which substantially eliminates any sideward or fore and aft rocking motion of the glass while permitting the latter to be raised and lowered with little effort.

Another object of this invention is to provide an improved air and waterproof device capable of either supporting and guiding a window glass during raising and lowering movements, or supporting and hinging one edge of a vent window for guiding the swinging movement of the latter.

A further object of this invention is to provide an improved glass guide device such as described which provides for more permanent alignment and subsequent freedom from looseness and rattles.

Another object of this invention is to provide an improved guide device of the class described provides improved glass stability throughout the complete range of window movement.

A further object of this invention is to provide an improved guide device such as described which is securely connected to the window glass and which is adapted to move freely in a supporting channel.

Still another object of this invention is to provide an improved guide device of the type described which forms a substantially weathertight joint with the division bar.

A further object of this invention is to provide an improved guide device such as described which is simple and economical in construction and effective in operation.

Other objects and features of this invention will become apparent as the description progresses.

*Brief description of the drawings*

In the accompanying drawings, in which one of various possible embodiments of this invention is illustrated in two different use applications, FIG. 1 is a perspective view of the front door of an automobile showing the general location of the device of this invention;

FIG. 2 is an enlarged fragmentary view of FIG. 1, certain parts being in a moved position;

FIG. 3 is an enlarged section taken along line 3—3 of FIG. 1;

FIG. 4 is a side elevation of a rear vent window showing the general location of the device of this invention as used therein; and FIG. 5 is an enlarged section taken along line 5—5 of FIG. 4.

In the drawings, like parts are indicated by corresponding reference characters throughout all of the views.

*Description of the preferred embodiment*

Referring now to the drawings, a typical front door of an automobile is generally indicated at 1 in FIG. 1. The front door has a window glass 3 and a front vent window 5 mounted therein with a division bar 7 or frame separating the two windows.

Division bar 7 is formed on one side thereof to receive a rubber stop and seal (not shown) for the rearward edge of the vent window 5 when the latter is swung to a closed position. The other side of division bar 7 is recessed as indicated at 9 to provide a main support channel 11 which has two opposed side channels 13 and 15 therein. The division bar 7 extends into the bottom portion of door 1 and channels 11, 13 and 15 extend throughout the entire length of the bar.

The window glass 3 is held in the channel 11 by means of the guide or support device 17 of this invention. Device 17 basically includes a length of weatherstripping 19, formed about the forward edge of glass 3, and two guides or supports 21 connecting the weatherstripping 19 to the glass at the upper and lower ends of the weatherstripping. Weatherstripping 19 has two opposed side portions 23 which extend rearwardly from an interconnecting portion 25 extending across the forward side margins of the glass. The weatherstripping is preferably formed of a plastic sheet material 27 (FIG. 3) such as Mylar, having a flocking 29 such as Dacron flocking, on one side thereof.

The flocking 29 is adjacent the window glass 3 along portions 23 and 25. Each side portion 23 is folded back upon itself along a line 31 to provide a forwardly extending portion 33. At the forward end of each portion 33 the weatherstripping is formed to provide channels 35 and 37, each having three wall portions 39, 41 and 43, which fit within channels 13 and 15. The flocking 29 is on the outside of the channels as shown in FIG. 3.

Each guide or support device 17 also comprises a pair of generally vertically extending shoes 45, formed preferably of plastic, located on opposite sides of glass 3 outside of the adjacent side portions 23. These shoes fit within the channels 35 and 37, adjacent the plastic sheet material 27. At the center of each shoe 45 a tubular projection 47 extends inwardly through a hole 49 in the adjacent side portion 23 of weatherstripping 19 and an aligned hole 51 in glass 3 toward the opposing shoe. A pin 53 extends from the tubular projection 47 on one shoe into the tubular projection 47 on the opposing shoe for locking the shoes together. Each end of each shoe 47 is provided with a foot portion 55 which engages the plastic sheet side of the respective side portion 23. The flocking on the outside of the channels 35 and 37 is pressed into contact with the respective channels 13 and 15 by the shoes 45 and facilitates movement of the shoes in the channels 13 and 15.

Installation of the guide device 17 of this invention on a glass 3 and division bar 7 is as follows:

First, the weatherstripping 19 is placed over the forward edge of glass 3 with the holes 49 therein horizontally and vertically aligned with holes 51 in the glass. Next, the two shoes 45 of each guide 21 are placed on the outside of weatherstripping side portions 23 and inside channel portions 35 and 37 with the tubular projections 47 and pin 53 extending through holes 49 and 51, and with feet 55 contacting side portions 23. One end of the assembly, such as the upper end, is then placed in the division bar 7 with weatherstripping channels 35 and 37 in side channels 13 and 15 and the glass is pushed generally vertically to thread the forward edge thereof in the division bar.

When the opposite end of the weatherstripping 19 is reached as the latter is threaded into the division bar 7, the guide 21 and weatherstripping 19 on such end are inserted in the channels 13 and 15 in the same manner as previously described. The window glass and the guide device will then move up and down as a unit in the division bar 7. The weatherstripping channels 35 and 37 which are pressed into contact with division bar channels 13 and 15 by shoes 21 substantially eliminate the possibility of any rocking or sideward motion of the glass. In addition the weatherstripping and guide insulate the glass from the metal division bar to eliminate rattle noises, and at the same time slide easily in the channels 13 and 15 to permit the window to be raised and lowered with little effort. Moreover, the joint provided by the division bar and device 17 is substantially watertight.

As set forth previously, the guide device 17 is also capable of use with a vent window for hinging the latter and guiding the swinging movement thereof. A typical rear vent window is indicated at 57 in FIG. 4. The forward edge of the window is received in a frame and bracket assembly 59 which is connected to a pillar (not shown). Assembly 59 includes an elongated member 61 having a main channel 63 (see FIG. 5) and side channels 65 and 67. Member 61 may also be provided with another channel portion 69 adjacent channel 67 between the latter and the pillar for appearance purposes.

The forward edge of vent window 57 is held in the elongated member 61 by means of the guide device 17 in the same manner as shown in FIGS. 1–3, i.e., with two sets of shoes 45 in a length of weatherstripping 19. The device 17 in cooperation with member 61 provides a substantially air and watertight joint while permitting the rearward end of the window 57 to be swung outwardly, i.e., counterclockwise as viewed in FIG. 5, for venting purposes. The shoes 45 act as hinges and guide the swinging movement of the window, and are considerably less expensive than the hardware normally used in vent hinges.

With regard to the use shown in FIGS. 1–3, it is to be noted that since the edge of the window is interlocked with the division bar, it is unnecessary to use an X-arm type of regulator mechanism to maintain the leading edge of the window in the division bar. It will therefore be seen that the guide device of this invention in one instance permits the use of a single arm regulator mechanism while providing for window stability throughout the complete range of movement of the window without creating any undue drag on the latter. Moreover, this invention may be used both for guiding the generally vertical movement of one window and for guiding the swinging movement of a vent window, thus reducing the number of different parts needed for window installation in an automobile, and also reducing the cost of mounting the windows.

While this invention, as shown in FIGS. 1–3, has been described herein with reference to the window glass in the front door of an automotive vehicle, it will be understood that it is also applicable to other windows having generally vertical movements, such as, for example, rear door windows, or the rear quarter windows, if it is desired to provide a single point connection, as opposed to a two point connection, between the window and the regulator mechanism. In a similar manner the invention as used in FIGS. 4 and 5 could be used for other windows having a swinging movement.

In view of the foregoing it will be seen that several objects and features of this invention are attained.

It will be understood that the invention is not to be limited to the exact constructions shown and described,

What is claimed is:

1. A device for supporting a window glass for movement in a recessed frame comprising first weatherstripping portions extending along the margins of one edge of the glass on opposite sides of the latter, a support having generally vertical portions on opposite sides of said glass and outside said first weatherstripping portions, second weatherstripping portions integrally connected to said first weatherstripping portions and extending over said generally vertical portions of said support, said generally vertical portions and said second weatherstripping portions extending into said frame, and generally horizontal connecting means extending from and between said generally vertical portions of said support through a hole in said glass for connecting the weatherstripping and glass together and to said generally vertical portions.

2. A device as set forth in claim 1 wherein said generally vertical portions of said support press said second portions of said weatherstripping into contact with said recessed frame, said second weatherstripping portions having flocking on the outside thereof for facilitating movement in the frame.

3. A device as set forth in claim 2 wherein each generally vertical portion includes foot members projecting from opposite ends thereof into contact with said first portions of the weatherstripping.

4. A device as set forth in claim 3, wherein said support is formed of plastic and in cooperation with said frame forms a hinge for guiding swinging movement of said window glass.

5. A device as set forth in claim 3, wherein said support is formed of plastic, said device being adapted to slide in said frame.

6. A device for guiding the movement of a window glass in a bar having two opposed channels therein, comprising weatherstripping formed about the end edge of the glass and having side portions on opposite sides of the glass, a first guide adjacent the upper end of the glass and a second guide adjacent the lower end of the glass, each of said guides comprising two generally vertically extending shoes on opposite sides of said glass and said weatherstripping, said weatherstripping having channel-shaped portions integrally connected with said side portions and covering said shoes, said shoes being located in said channel-shaped portions and the latter being located in said channels, and generally horizontal connecting means extending between said shoes through generally horizontally aligned holes in said side portions of said weatherstripping and the glass for connecting said weatherstripping, said glass and said shoes together.

7. A device as set forth in claim 6, wherein each of said shoes is formed of plastic and has an upper and a lower foot extending toward said glass into contact with said side portions of said weatherstripping.

8. A device as set forth in claim 7 wherein said channel-shaped portions of said weatherstripping have flocking on the outside thereof to facilitate sliding in the respective channel.

9. A device as set forth in claim 7 wherein said channel-shaped portions of said weatherstripping have flocking on the outside thereof, said guides in cooperation with said channels forming hinges for guiding swinging movement of said window glass.

References Cited

UNITED STATES PATENTS

| | | | |
|---|---|---|---|
| 2,893,781 | 7/1959 | Hoag et al. | 49—144 |
| 3,141,664 | 7/1964 | Chupick | 49—440 X |
| 3,151,859 | 10/1964 | Miles et al. | 49—431 X |

DAVID J. WILLIAMOWSKY, *Primary Examiner.*

J. K. BELL, *Assistant Examiner.*